United States Patent [19]

Arnold et al.

[11] Patent Number: 5,781,879
[45] Date of Patent: Jul. 14, 1998

[54] SEMANTIC ANALYSIS AND MODIFICATION METHODOLOGY

[75] Inventors: Donald J. Arnold, Centreville; Joseph John Lawn, Reston, both of Va.

[73] Assignee: QPL LLC, Centreville, Va.

[21] Appl. No.: 592,034

[22] Filed: Jan. 26, 1996

[51] Int. Cl.$^6$ ............................. G06F 17/28; G06F 17/30
[52] U.S. Cl. ............................. 704/9; 704/10; 707/530; 707/532
[58] Field of Search .............................. 395/201, 207, 395/211, 214, 761, 779, 792, 793, 794, 803, 759, 760, 935, 936; 705/1, 7, 11, 14; 704/1, 2, 7, 9, 10; 707/500, 517, 530, 531, 532, 541, 542, 540

[56] References Cited

U.S. PATENT DOCUMENTS

| | | | |
|---|---|---|---|
| 4,384,329 | 5/1983 | Rosenbaum et al. | 395/760 |
| 4,773,039 | 9/1988 | Zamora | 395/803 |
| 5,424,945 | 6/1995 | Bell | 705/1 |
| 5,619,709 | 4/1997 | Caid et al. | 395/794 |
| 5,708,825 | 1/1998 | Sotomayor | 707/501 |

OTHER PUBLICATIONS

Randon House Word Menu, Stephen Glazer, Random House, New York 1992.
CRC Handbook of Chemistry and Physics, Robert C. Weast, Ph.D., 68th Edition.
Roget's II, The New Theasurus, Expanded Edition, Houghton Mifflin Company, Boston.
Dolak; "Shareware Style Checkers"; *Library Software Review*; v8 n5; p. 296(6); Sep.–Oct. 1989; Dialog File 148, Acc# 04124840.
Dialog Abstract: File 2, Acc# 03865518; Slator; "Extracting Lexical Knowledge from Dictionary Text"; *Proceedings of the 3rd Knowledge Acquisition of Knowledge–Based Systems Workshop*; 1989; pp. 33/1–18.
Beck et al; "Toward a Rhetoric of Technical Proposals; Ethos and Audience Analysis"; *Technical Communication*; v39 n1; p. 122(5); Feb. 1992; Dialog: File 148, Acc# 05892060.

*Primary Examiner*—Stephen R. Tkacs
*Attorney, Agent, or Firm*—Finnegan, Henderson, Farabow, Garrett & Dunner L.L.P.

[57] ABSTRACT

A process for analyzing the informational and semantic content of an information source, such as text, a picture, or a video sequence. After compiling a lexicon of information elements, values are assigned to each element for relevant categories. A target information store is compared to the lexicon to calculate values for each category. Information elements are substituted to modify the store to the desired level. The methodology has broad application to analysis of semantic content of visual, verbal, and auditory input streams, such as graphics, text, video, and music. In a textual example, a word list is compiled and values are assigned to the determined categories. Individual words and entire documents are compared to this repository for calculating semantic content in various categories. Values for semantic content in each category are determined. Samples with undesirable scores can be adjusted through substitutions to modify the document. This process may be automated using a computer system for analysis and modification.

45 Claims, 4 Drawing Sheets

Semantic Analysis and Modification Methodology

FLOW CHART

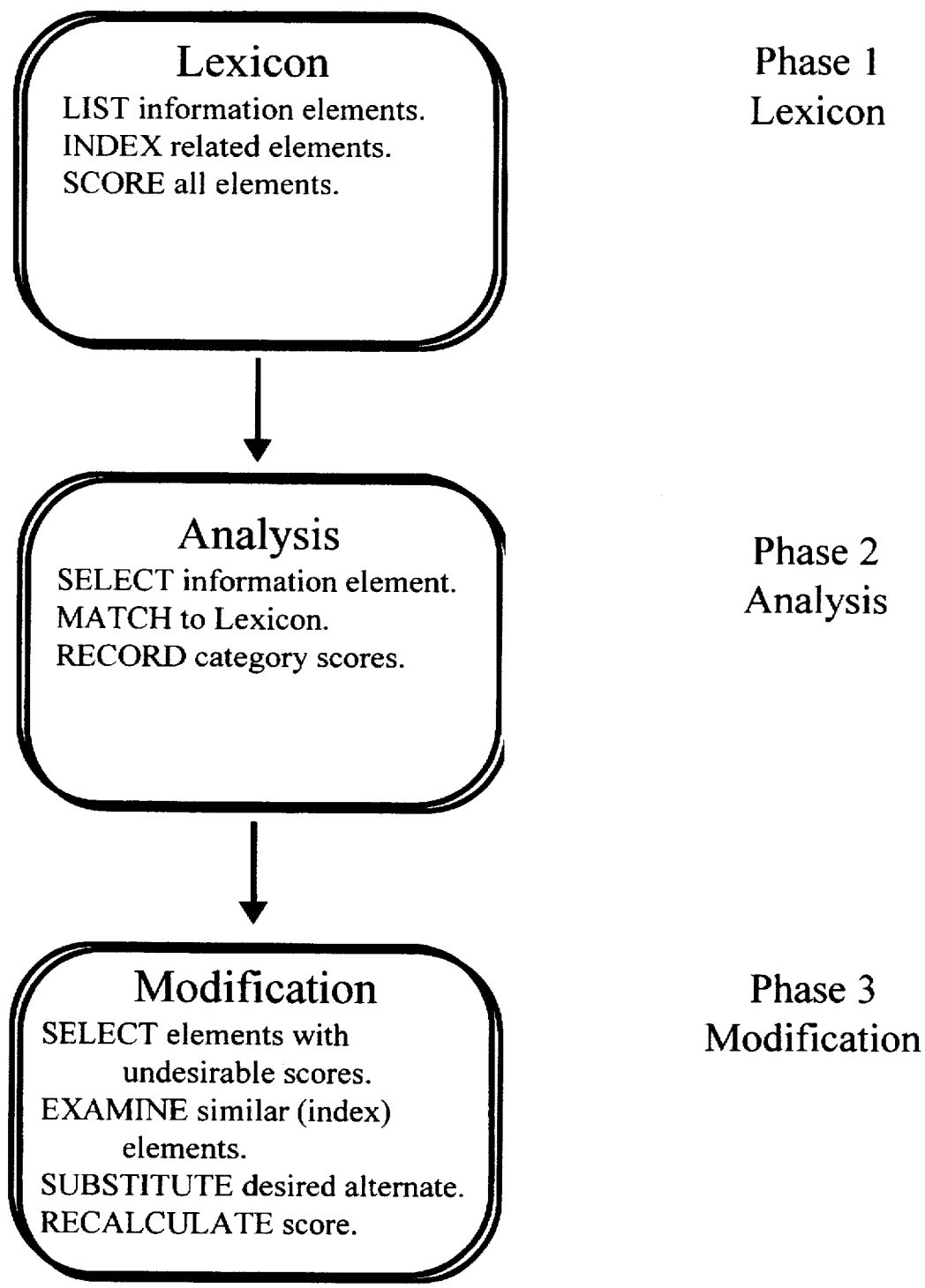
Figure 1: Semantic Analysis and Modification Methodology

Figure 2: Semantic Analysis and Modification Methodology
FLOW CHART
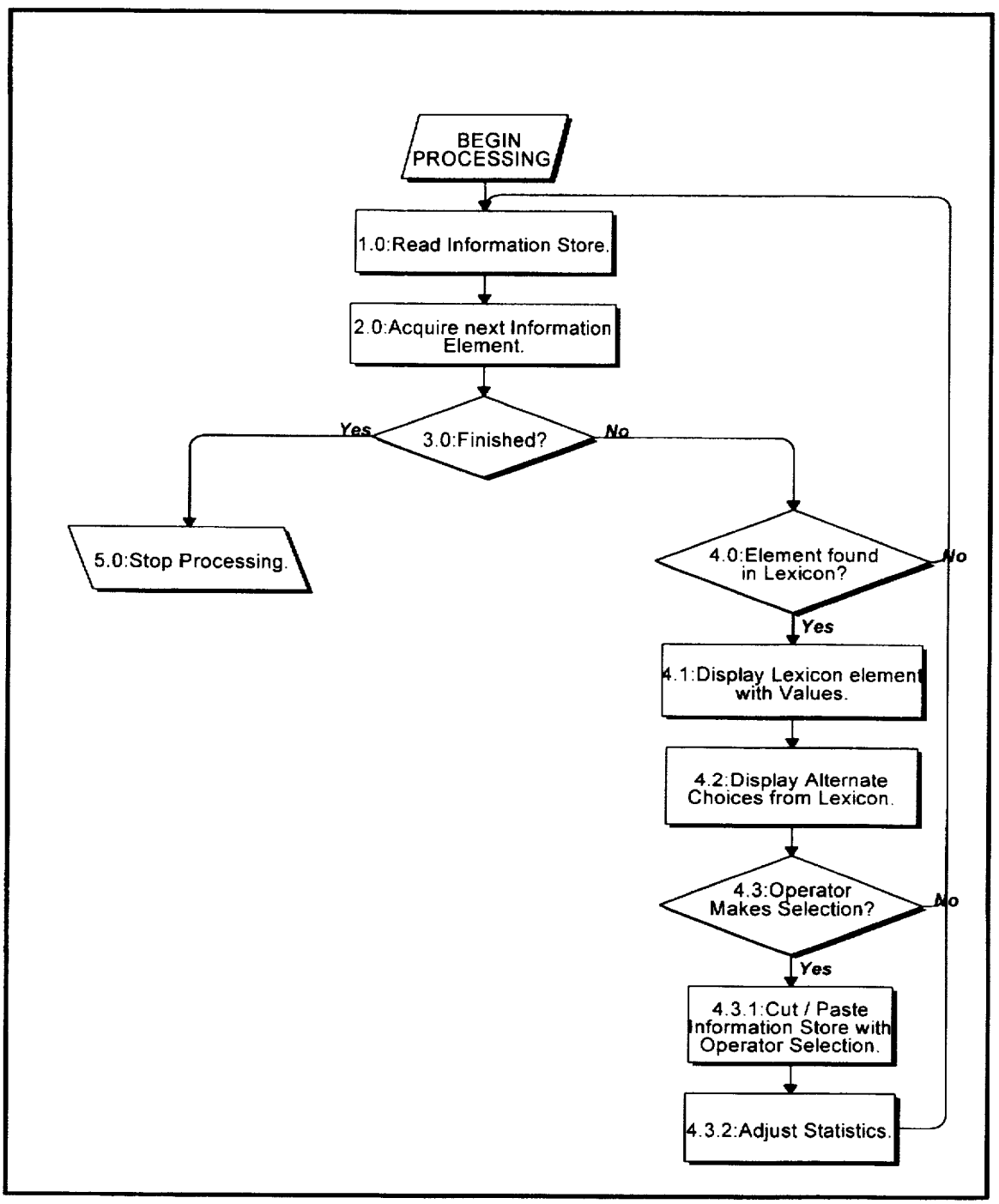

Figure 3: Semantic Analysis and Modification Methodology
Text example

Table 3-1

| Verbal | Parameters | | |
|---|---|---|---|
| | Index | Active - Passive | Objective - Emotional |
| soon | 1 | 3 | 3 |
| now | 1 | 1 | 4 |
| hour | 1 | 3 | 2 |
| time | 1 | 2 | 3 |
| some | 2 | 3 | 2 |
| all | 2 | 3 | 3 |
| good | 3 | 3 | 3 |
| strong | 3 | 1 | 4 |
| men | 4 | 2 | 4 |
| people | 4 | 4 | 3 |
| help | 5 | 2 | 4 |
| aid | 5 | 1 | 5 |
| party | 6 | 2 | 4 |
| club | 6 | 3 | 2 |

Table 3-2:  Sample source
"Soon is the hour for some strong people to come to the help of the club."

| | | A-P | O-E |
|---|---|---|---|
| Soon | | 3 | 3 |
| is | | x | x |
| the | | x | x |
| hour | | 3 | 2 |
| for | | x | x |
| some | | 3 | 2 |
| strong | | 1 | 4 |
| people | | 4 | 3 |
| to | | x | x |
| come | | x | x |
| to | | x | x |
| the | | x | x |
| help | | 2 | 4 |
| of | | x | x |
| the | | x | x |
| club | | 3 | 2 |
| | | | |
| Total | | 19 | 20 |
| Average | | 2.71 | 2.86 |

Table 3-3  Revised text
REVISE through Semantic Analysis Modification, to increase "active" and "emotional" parameter ratings:
"Now is the time for all good men to come to the aid of the party"

| | | A-P | O-E |
|---|---|---|---|
| Now | | 1 | 4 |
| is | | x | x |
| the | | x | x |
| time | | 2 | 3 |
| for | | x | x |
| all | | 3 | 3 |
| good | | 3 | 3 |
| men | | 2 | 4 |
| to | | x | x |
| come | | x | x |
| to | | x | x |
| the | | x | x |
| aid | | 1 | 5 |
| of | | x | x |
| the | | x | x |
| party | | 2 | 2 |
| | | | |
| Total | | 14 | 24 |
| Average | | 2.33 | 4.00 |

Figure 4: Semantic Analysis and Modification Methodology
Graphics Example

Table 4-1

| Graphics Lexicon | Parameters | | |
|---|---|---|---|
| | Index | Nostalgic - Innovative | Happy -- Sad |
| Image object | | | |
| Bold line | 1 | 2 | 4 |
| Dotted line | 1 | 2 | 5 |
| Parallel lines | 1 | 3 | 5 |
| Plain line | 1 | 4 | 3 |
| Circle | 2 | 1 | 2 |
| Arc | 2 | 2 | 3 |
| Irregular area | 2 | 5 | 3 |
| Rectangle | 2 | 3 | 4 |
| Square | 2 | 2 | 5 |
| Triangle | 2 | 4 | 5 |
| Blue | 3 | 5 | 5 |
| Green | 3 | 2 | 3 |
| Red | 3 | 4 | 3 |
| White | 3 | 4 | 2 |
| Yellow | 3 | 3 | 2 |

Table 4-2

| Score: | | N-I | H-S |
|---|---|---|---|
| Circle | | 1 | 2 |
| Arcs | | 2 | 3 |
| Green | | 2 | 3 |
| Red | | 1 | 3 |
| Yellow | | 3 | 3 |
| Rectangle | | 3 | 4 |
| Bold line | | 2 | 4 |
| Dotted line | | 2 | 5 |
| | | | |
| Aggregate: | | 16 | 27 |
| Average: | | 2 | 3.375 |

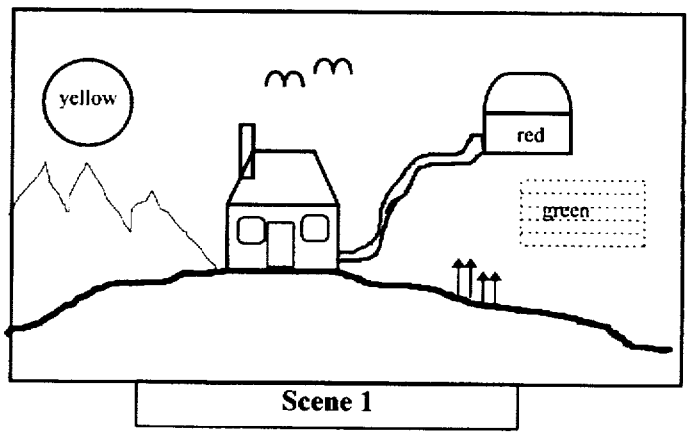
Scene 1

Table 4-3

| Score: | | N-I | H-S |
|---|---|---|---|
| Irregular | | 5 | 3 |
| Parallel | | 3 | 5 |
| Square | | 2 | 5 |
| Triangle | | 4 | 5 |
| Black | | 3 | 5 |
| White | | 4 | 2 |
| Plain line | | 4 | 3 |
| Rectangle | | 3 | 4 |
| | | | |
| Aggregate: | | 28 | 32 |
| Average: | | 3.5 | 4 |

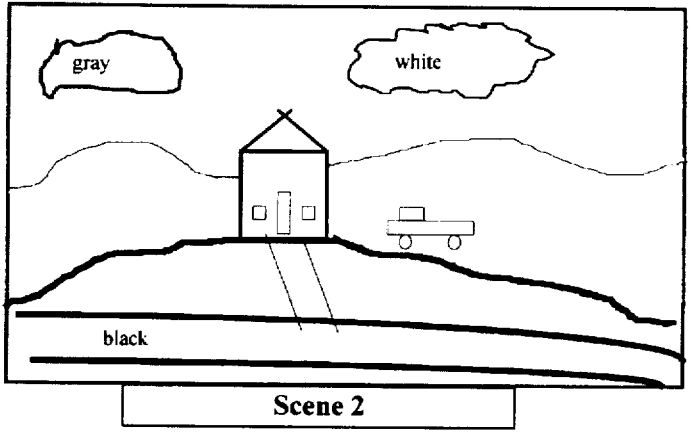
Scene 2

5,781,879

SEMANTIC ANALYSIS AND MODIFICATION METHODOLOGY

BACKGROUND OF THE INVENTION

1. Field of the Invention

The present invention relates to information processing, specifically to analysis and evaluation of semantic content of information stores, such as text, images, sound, and video. "Semantic content" refers to the interpreted value of an information element, in comparison to baseline parameters. "Information store" refers to any source of information elements. Information elements, such as word, graphic devices, musical notes and chords, pictures and the like, are assembled into information stores in documents, pictures, animations, songs or scores, or other units. Textual data is used herein as the primary example; application to other information stores will be described later in this document.

2. Prior Art

Current computerized word processing often includes dictionary and thesaurus capabilities to allow the editor to highlight a word or phrase and to examine either meaning or synonyms. Selection and substitution is allowed using commonly available techniques with pointing devices, keyboards, or touchscreens.

Further, automated spell checkers are available to parse through text and compare each word with a list of all known words. The editor is presented with a judgmental option to accept or reject matches from the various word lists.

Existing grammar checkers scan text and identify selected grammatical patterns, such as subject-verb agreement or consistency in case and number; redundancy of terms, verbal consistency, and others.

No process is known to provide quantified values for multiple parameters in order to determine the emotional or psychological impact of the total body of text and to allow for substitution based on such parameters. No process is known to apply such a technique to other semantically rich information stores, such as music, art, video, or graphics.

Due to the importance of semantic context, it is useful to be able to compare a sample document (or composition, picture, photograph, image, etc.) to a known set of words (or phrases, chords, images, etc.), and to produce a relative ranking of the samples in terms of their evocation of psychological response.

In U.S. Pat. No. 4,773,039, Zamora describes a mechanism for compaction and replacement of phrases deemed to be "trite" or redundant. Rosenbaum et al., in U.S. Pat. No. 4,384,329, provide a method for storing and retrieving synonyms and antonyms. These fall short of evaluating the text for semantic content and determining a quantitative score for words or the entire text body.

With increasing tendency towards minimal physical human contact, more and more businesses are adopting communications mechanism that utilize computer technology. Word processing, voicemail, fax technology, E-mail, and other tools provide mechanisms for creating and delivering a wide variety of messages. Simple business letters promoting a product may be used as direct mail advertising to millions of consumers. Print, television, and radio are joined by Internet advertising to deliver messages about products and politics. It is increasingly vital to deliver a precise message, exactly, with proper intonation. Too strident a voice raises concerns; too gentle a delivery is ignored.

It is clear from researchers from Marshall McLuhan to Deborah Tannen that semantic content and context is crucial to the message receiver. By knowing the relative semantic values and impacts of alternative phrasing or word choice, it is possible to more carefully craft messages. For example, the words "inheritance" and "legacy" are synonyms. However, the impression that either leaves on a listener or reader is significantly different. An image of a circle may have greater symbolism for religion, versus science. This indicates that, in general, a viewer of an image containing a circle or circular object will interpret the overall image as more religious than if it did not contain the circle. With the richness of the English language, with the infinite possible melodies and chord progressions, and with the video magic available from computer simulations and animations, a process for evaluating the relative conciseness of an information stream can provide significant value.

SUMMARY OF THE INVENTION

It is therefore the object of this invention to provide a process for evaluating and ranking the semantic content of an information store, including text, graphics, video, image, music or vocal messages. It is a further object of the present invention is to define a process for modifying the elements of the information store, where "elements" are informational units, such as text in a letter, advertisement, or other document, to achieve desired subtleties of meaning based on a comparative scoring system. This provides a mechanism for substituting different information elements so as to adjust the semantic content delivered towards the intended message of the information creator.

Another object is to allow writers or editors to produce objective scores for various documents that can be used in assessing the effectiveness of alternative documents at imparting the desired informational content.

A further object is to develop computerized techniques for implementing the processes described above and detailed below. The processes can be applied to sound, images, color, tactile, scent, or any other information-rich media, to achieve the desired effects of rigorous semantic tuning and contextual improvement.

The foregoing objects can be accomplished by the use of a semantic analysis process. A standard lexicon of information elements is built, assigning values for various categories with each element in the lexicon. A target information store is analyzed by examining each information element (word, picture, etc.) and comparing it to the base lexicon. Any match is used to compute a score in the various categories, by adding the values for those categories from the lexicon. In the aggregate, this can be used to calculate a total score for each parameter, and an average score based on the total number of matches. Upon determination of the aggregate score, matching constructs can be analyzed individually against the aggregate average score. The lexicon provides a keyed list of elements with synonymous or similar meanings, and differing semantic ratings. A parameter with a determined low score can be adjusted by substituting a similar unit with a higher value in that parameter. "Lexicon" refers to a collection of informational elements, suitable for content analysis. An informational element may be a word, a phrase, an object in a photograph, or similar component of an information store that has meaning and semantic content in its own right.

BRIEF DESCRIPTION OF THE DRAWINGS

FIG. 1 shows the procedural flow of the invention in its general case. FIG. 2 is a flow chart of the analysis and modification process steps. FIG. 3 illustrates an example of the invention applied to a textual data source. FIG. 4 illustrates an implementation of the invention applied to a graphical input source.

DESCRIPTION OF THE PREFERRED EMBODIMENT

The process for semantic analysis and modification has three phases, as depicted in FIG. 1. Phase 1 is the establishment of a lexicon, a collection of relevant information elements with relative values ascribed to each element. First, a list of information elements is compiled. This list includes elements known to be relevant to the target information stores to be analyzed. Elements with some arbitrary degree of similarity so as to be possible substitutions may be assigned a common index number. Each element is assigned values indicating the relative score of that element to some predetermined category of semantic content.

Phase 2 is the analysis of a specific information store, whereby each information element within the store is matched to the lexicon. If there is a match, the values assigned in the lexicon are noted and recorded. Information required for statistical analysis includes total information elements, number of elements matching the lexicon, number of elements not matching the lexicon, and number of elements deemed insignificant to the analysis. Various statistical measures are computed, including but not limited to: sums, averages, and weighted totals.

Phase 3 is the modification of the information store to produce a more desirable score. Elements with undesirable scores are selected and are considered for replacement by similar lexicon entries with the same index value and differing scores for the predetermined categories. If desired, a lexicon entry may be substituted for an information element. The scoring analysis of Phase 2 may then be repeated to determine the impact of modification(s). The order in which the phases are performed may vary.

FIG. 2 presents a flow chart demonstrating the mechanism of the semantic analysis and modification methodology, as described below:

---

BEGIN PROCESSING.
   Initialization of routines, opening of supportive files, all background work performed before system starts processing.
1.0: Read Information Store.
   The Information Store submitted by the operator is identified, found, and initialized.
2.0: Acquire next Information Element.
   The Information Store is processed until an Information Element is identified and submitted for continuation of processing.
3.0: Finished?
   A test is performed to see if 'end of store' was reached.
   (Yes)
   5.0: Stop Processing
      The Information Store has been completely read for input, and further processing is discontinued
   (No)
   4.0: Element found in Leixcon Data Base?
      The Information Store has not been completely read. An Information Element has been acquired. The element is submitted to the Lexicon, and the resulting response is processed.
   (Yes)
      The element was found to be contained in the Lexicon.
   4.1: Display Lexicon element with Values.
      The element with its declared values are displayed for operator perusal.
   4.2: Display Alternate Choices from Lexicon.
      Appropriate choices are displayed from the Lexicon.
   4.3: Operator Makes Selection?
      The operator has the ability to make a selection from the choices presented, or to decide not to make changes.

---

(Yes)
   The operator has elected to make a change.
4.3.1: Cut/Paste Information Store with Operator Selection.
   The system inserts the new information element into the Information Store.
4.3.2: Adjust Statistics.
   Recalcutate statistics based upon the modified Information Store.
(No)
   The operator elected not to make any changes.
   Processing continues at Step 1.0
(No)
   The element was not found to be contained within the Lexicon.
   Processing continues at Step 1.0

NOTE: In 'automated mode' the operator makes an initial selection, and then all values found in Step 4.0 are automatically chosen in Step 4.3

---

ADDITIONAL EMBODIMENTS, FIGS. 3 AND 4

FIG. 3 is a text analysis and modification tool. This embodiment illustrates the procedural foundation for additional embodiments, all of which implement the same process using differing information stores and lexicons.

Phase 1 is the development of a lexicon of relevant words and terms, based on the intended subject area. The word "fungible," for example, is more likely to be encountered in financial documents, while "fungicide" is more likely in a sports medicine pamphlet. Words determined to be relevant and significant to the desired documents and to the audience are then compiled and matched according to meaning, intent, or broad classification. This is similar in principle to a thesaurus, which provides synonyms, but differs in substance in that it is not limited to words of the same meaning. Words are grouped according to the arbitrary classes dictated by the intended application. Words within the groups are assigned numeric values for a specific set of parameters. The lexicon, then, consists of a vocabulary of words and/or phrases, with an index value to relate groups of words that are classified as similar according to some desired criterion, and of a list of values for each word for arbitrary parameters. Table 3-1 presents a simplified Verbal Lexicon, with a listing of the vocabulary in Column 1, the index numbers which identify words classified as similar in Column 2, and two scoring parameters in Columns 3 and 4. The values in Columns 3 and 4 are scaled from 1 to 5 to indicate the weighting of each vocabulary word towards the two parametric values in Column 3, labeled "Active-Passive", a value of "1" indicates an "active" word, while a value of "5" indicates a "passive" word. The value "3" indicates that the word has no significant impact of active or passive.

In the second phase, information store analysis, a selection of text is examined to identify words or phrases that are also found in the lexicon. If a word in the selection is found to be present in the lexicon, it therefore has values assigned for the categories, and the word and its values are noted. The next word is then assessed in the same way. After progressing through the entire document, the average value for each category of analysis is calculated to determine the overall document score.

The third phase is modification, in which the overall document scores are adjusted by making changes to the original document, substituting a similar term with an element with a more desirable score in a given category. A more "active" word can be selected from the lexicon to increase the interpreted "active" nature of the document. The revision phase involves the substitution of different words from the lexicon for words within the text selection, based on average and individual word score. This allows the editor to control not only the physical aspects of the composition, but also to modify the semantic content.

Subjective reflection determines whether the semantics of the parameters are acceptable. If the "call to action" of the source is deemed to be not active enough, and too objective, substitutions from the lexicon may be drawn to achieve greater action and greater emotion. The index numbers in the lexicon is used to evaluate alternative language, and substitutions are made to increase the desired parameters. Substituting "now" for "soon" increases the "Active" parameter while simultaneous increasing the "Emotional" parameter.

FIG. 3 presents a sample case, based on a single sentence as the input source:

"Soon is the hour for some strong people to come to the help of the club."

Table 3-1 presents a sample lexicon, illustrating the word list in column one, index values in column two, and parameters for two categories of semantic content in columns three and four. Table 3-2 presents the analysis and scoring for the sample information store. Table 3-3 shows the scoring for the store after modification using the semantic analysis and modification process.

Applying the values found in the lexicon (FIG. 3, Table 3-1), each word is determined to have a specific weight for the two parameters of "Active-Passive" and "Objective-Emotional". "Soon", for example has value of "3" for each parameter, while "people" has values of "4" and "3", respectively. Total and average scores for the input source for each parameter is calculated, with the averages at 2.71 for "A-P," and 2.86 for "O-E." For illustration, the document is modified to increase the "Active" score by lowering the "A-T" parameter, and to increase the "Emotional" score by raising the "O-E" parameter. Each word (Information Element) is compared to lexicon entries with matching index values to select revisions. "Soon" is replaced with "Now," "hour" is replaced with "time." and so forth through the sentence. The modified text has more desirable scores for action and emotion:

"Now is the time for all good men to come to the aid of the party"

FIG. 4 presents another an analogous extension of the processes of the previous embodiment, applied to a visual information source, such as a picture, a video or animation sequence, or an image.

A lexicon of semantic content is built for standard visual components in an image (Table 4-1.) For example, geometric shapes (polygons), colors, text attributes such as font, underline, bold, lines, and other objects are rated for semantic content across some semantic classifications. In this example, values in each column, from 1 to 5, indicate the degree of semantic content, with "1" "high in the initial reference (e.g., "Nostalgic" or "Happy"), and "5" high in the second reference (e.g., "Innovative" or "Sad"). Table 4-2 presents the score of Scene 1 based on the Lexicon in Table 4-1, and Table 4-3 presents the score for Scene 2. Scene 1 is rated higher in "Innovative" and "Happy", while Scene 2 scores higher for "Nostalgic" and "Sad". This allows a more objective and quantified choice between the two illustrations in conveying an intended message.

Additional embodiments are in the application of this process to other sensory inputs with the intention of modification of semantic content based on reference to a general or specific lexicon with appropriate parameters, to wit:

Any visual information source, such as images, photographs, video, or film;

Any auditory information source, including voice, music, sound effects, or other tonal sources;

Any tactile information source; whereby a lexicon of textures, rigidity, and other "feel" variables is assembled for semantic analysis and rating;

Any aromatic information source, whereby a lexicon of smells or fragrances is assembled for semantic analysis and rating.

CONCLUSION, RAMIFICATIONS AND SCOPE

The reader will see that this invention defines a process for improving the content and impact—the "message"—imparted by a work intended to convey information. In creating a lexicon, the semantic significance of various information elements is examined, which produces an increased understanding of the elements in itself. Defining various categories of semantic significance implements a more rigorous process of analysis of the content of the information store. The analysis phase of comparing a random collection of elements (the information store) to an organized and quantified lexicon enforces greater discipline to the process of evaluating the content and message of the store. Use of the lexicon to systematically modify the information store after analysis provides a level of rigor heretofore not available to the editor or critic.

While the description and examples above contain many specificities, these should not be construed as limitations on the scope of the invention, but rather as an exemplification of one or more preferred embodiments therof. Implementation of the process may be manual or automated, using computerized tools or pen and paper, or an even more manual process. Many other variations are possible. Any comparison and modification process that follows the LEXICON-ANALYSIS-MODIFICATION steps, using objective or subjective quantification of some parameter(s) of discrete elements to evaluate the overall content of a body of information along those parameters, is an implementation of this process. For example, various tactile attributes can be quantified along categories to evaluate the suitability of surface materials or finishes for various purposes. Advertisements, direct mail marketing materials, computer software and many other information-rich media aimed at large audiences can benefit from this process.

Accordingly, the scope of the invention should be determined not by the embodiments illustrated but by the appended claims and their legal equivalents.

What is claimed:

1. A computer-implemented process for evaluating semantic content of a collection of information items comprising the steps of:

referencing a lexicon data base having a list of information elements and associated values for predetermined categories of semantic content;

determining which of the elements of the collection of information items are in the lexicon data base;

extracting the associated values for each of the elements of the collection of information items determined to be in the lexicon data base; and establishing, from the extracted associated values, a measure reflecting the semantic content of the collection.

2. The process of claim 1, further including the steps of creating a modified collection of information items by replacing a selected one of the elements of the collection of information items determined to be included in the lexicon data base with an alternate element from the lexicon data base.

extracting the associated values for each of the elements of the modified collection of information items determined to be included in the lexicon data base; and establishing, from the extracted associated values, a new measure reflecting the semantic content of the modified collection.

3. The process of claim 2, wherein the creating step includes the step of displaying a list of alternate elements in the lexicon data base for the selected element, and receiving an indication for one of the alternate elements.

4. The process of claim 3, wherein the displaying step includes the step of displaying the associated values for each of the alternate elements in the list.

5. The process of claim 1, wherein the step of referencing the lexicon data base includes the step of referencing the lexicon data base having a list of words.

6. The process of claim 5, wherein the step of extracting the associated values includes the step of extracting a value representing an Active-Passive parameter.

7. The process of claim 5, wherein the step of extracting the associated values includes the step of extracting a value representing an Objective-Emotional parameter.

8. The process of claim 1, wherein the step of establishing a measure includes the step of averaging the extracted values.

9. The process of claim 1, wherein the step of establishing a measure includes the step of summing the extracted values.

10. The process of claim 1, wherein the step of establishing a measure includes the step of finding a weighted total of the extracted values.

11. The process of claim 1, wherein the step of referencing the lexicon data base includes the step of referencing the lexicon data base having a list of visual components.

12. The process of claim 1, wherein the step of referencing the lexicon data base includes the step of referencing the lexicon data base having a list of visual information.

13. The process of claim 1, wherein the step of referencing the lexicon data base includes the step of referencing the lexicon data base having a list of auditory information.

14. The process of claim 1, wherein the step of referencing the lexicon data base includes the step of referencing the lexicon data base having a list of tactile information.

15. The process of claim 1, wherein the step of referencing the lexicon includes the step of referencing the lexicon data base having a list of aromatic information.

16. A computer readable medium containing instructions for directing a computer to perform a process for evaluating semantic content of a collection of information items, the medium comprising:

means for causing a computer to reference a lexicon data base having a list of information elements and associated values for predetermined categories of semantic content;

means for causing a computer to determine which of the elements of the collection of information items are included in the lexicon data base;

means for causing a computer to extract the associates values for each of the elements of the collection of information items determined to be included in the lexicon data base; and means for causing a computer to establish, from the extracted associated values, a measure reflecting the semantic content of the collection.

17. The computer readable medium of claim 16, further including means for causing a computer to create a modified collection of information items by replacing a selected one of the elements of the collection of information items determined to be included in the lexicon data base with an alternate element from the lexicon data base, means for causing a computer to extract the associated values for each of the elements of the modified collection of information items determined to be included in the lexicon data base; and means for causing a computer to establish, from the extracted associated values, a new measure reflecting the semantic content for the modified collection.

18. The computer readable medium of claim 17, wherein the means for causing a computer to create includes means for causing a computer to display a list of alternate elements in the lexicon data base for the selected element, and means for causing a computer to receive an indication for one of the alternate elements.

19. The computer readable medium of claim 18, wherein the means for causing a computer to display includes means for causing a computer to display the associated values for each of the alternate elements in the list.

20. The computer readable medium of claim 16, wherein the means for causing a computer to reference the lexicon data base includes the step of means for causing a computer to reference the lexicon data base having a list of words.

21. The computer readable medium of claim 20, wherein the means for causing a computer to extract the associated values includes means for causing a computer to extract a value representing an Active-Passive parameter.

22. The computer readable medium of claim 20, wherein the means for causing a computer to extract the associated values includes means for causing a computer to extract a value representing an Objective-Emotional parameter.

23. The computer readable medium of claim 16, wherein the means for causing a computer to establish a measure includes means for causing a computer to average the extracted values.

24. The computer readable medium of claim 16, wherein the means for causing a computer to establish a measure includes means for causing a computer to sum the extracted values.

25. The computer readable medium of claim 16, wherein the means for causing a computer to establish a measure includes means for causing a computer to find a weighted total of the extracted values.

26. The computer readable medium of claim 16, wherein the means for causing a computer to reference the lexicon data base includes means for causing a computer to reference the lexicon data base having a list of visual components.

27. The computer readable medium of claim 16, wherein the means for causing a computer to reference the lexicon data base includes means for causing a computer to reference the lexicon data base having a list of visual information.

28. The computer readable medium of claim 16, wherein the means for causing a computer to reference the lexicon data base includes means for causing a computer to reference the lexicon data base having a list of auditory information.

29. The computer readable medium of claim 16, wherein the means for causing a computer to reference the lexicon data base includes means for causing a computer to reference the lexicon data base having a list of tactile information.

30. The computer readable medium of claim 16, wherein the means for causing a computer to reference the lexicon includes means for causing a computer to reference the lexicon data base having a list of aromatic information.

31. A system for evaluating semantic content of a collection of information items comprising:

means for referencing a lexicon data base having a list of information elements and associated values for predetermined categories of semantic content;

means for determining which of the elements of the collection of information items are included in the lexicon data base;

means for extracting the associated values for each of the elements of the collection of information items determined to be included in the lexicon data base; and means for establishing, from the extracted associated values, a measure reflecting the semantic content of the collection.

32. The system of claim 31, further including means for creating a modified collection of information items by replacing a selected one of the elements of the collection of information items determined to be included in the lexicon data base with an alternate element from the lexicon data base.

means for extracting the associated values for each of the elements of the modified collection of information items determined to be included in the lexicon data base; and means for establishing, from the extracted associated values, a new measure reflecting the semantic content of the modified collection.

33. The system of claim 32, wherein the creating means includes means for displaying a list of alternate elements in the lexicon data base for the selected element, and means for receiving an indication for one of the alternate elements.

34. The system of claim 33, wherein the displaying means includes means for displaying the associated values for each of the alternate elements in the list.

35. The system of claim 31, wherein the means for referencing the lexicon data base includes means for referencing the lexicon data base having a list of words.

36. The system of claim 35, wherein the means for extracting the associated values includes means for extracting a value representing an Active-Passive parameter.

37. The system of claim 35, wherein the means for extracting the associated values includes means for extracting a value representing an Objective-Emotional parameter.

38. The system of claim 31, wherein the means for establishing a measure includes means for averaging the extracted values.

39. The system of claim 31, wherein the means for establishing a measure includes means for summing the extracted values.

40. The system of claim 31, wherein the means for establishing a measure includes means for finding a weighted total of the extracted values.

41. The system of claim 31, wherein the means for referencing the lexicon data base includes means for referencing the lexicon data base having a list of visual components.

42. The system of claim 31, wherein the means for referencing the lexicon data base includes means for referencing the lexicon data base having a list of visual information.

43. The system of claim 31, wherein the means for referencing the lexicon data base includes means for referencing the lexicon data base having a list of auditory information.

44. The system of claim 31, wherein the means for referencing the lexicon data base includes means for referencing the lexicon data base having a list of tactile information.

45. The system of claim 31, wherein the means for referencing the lexicon includes means for referencing the lexicon data base having a list of aromatic information.

* * * * *